(12) United States Patent
Albertus et al.

(10) Patent No.: US 10,218,028 B2
(45) Date of Patent: Feb. 26, 2019

(54) ELEVATED TEMPERATURE LI/METAL BATTERY SYSTEM

(71) Applicant: Robert Bosch GmbH, Stuttgart (DE)

(72) Inventors: Paul Albertus, Washington, DC (US); John F. Christensen, Mountain View, CA (US); Timm Lohmann, Mountain View, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 1171 days.

(21) Appl. No.: 14/459,781

(22) Filed: Aug. 14, 2014

(65) Prior Publication Data

US 2015/0050529 A1    Feb. 19, 2015

Related U.S. Application Data

(60) Provisional application No. 61/866,219, filed on Aug. 15, 2013.

(51) Int. Cl.
*H01M 10/0562* (2010.01)
*H01M 10/48* (2006.01)
(Continued)

(52) U.S. Cl.
CPC ..... *H01M 10/052* (2013.01); *H01M 10/0562* (2013.01); *H01M 10/486* (2013.01); *H01M 10/635* (2015.04)

(58) Field of Classification Search
None
See application file for complete search history.

(56) References Cited

U.S. PATENT DOCUMENTS 5,871,859 A * 2/1999 Parise ................ B01F 5/0614
                                                    320/150
6,146,783 A   11/2000 Brohm et al.
(Continued)

FOREIGN PATENT DOCUMENTS

CN        1753240 A    3/2006
CN      101223669 A    7/2008
(Continued)

OTHER PUBLICATIONS

International Search Report and Written Opinion corresponding to PCT Application No. PCT/US2014/051094, dated Nov. 28, 2014 (10 pages).
(Continued)

*Primary Examiner* — Rena Dye Cronin
(74) *Attorney, Agent, or Firm* — Maginot Moore & Beck LLP

(57) ABSTRACT

In accordance with one embodiment an electrochemical cell system includes a housing, at least one electrochemical cell within the housing and including an anode including a form of lithium, and an ionic liquid electrolyte within a cathode, the cathode separated from the anode by a solid separator impervious to the ionic liquid electrolyte, a temperature sensor within the housing, and an environmental controller at least partially positioned within the housing and configured to maintain a temperature within the housing at least 50° C. above ambient based upon input from the temperature sensor.

14 Claims, 2 Drawing Sheets

(51) Int. Cl.
*H01M 10/635* (2014.01)
*H01M 10/052* (2010.01)

(56) References Cited

U.S. PATENT DOCUMENTS

| | | | |
|---|---|---|---|
| 8,008,891 B2* | 8/2011 | Yun | B60L 11/1861 320/132 |
| 8,395,356 B2* | 3/2013 | Schaefer | H01M 10/0525 320/134 |
| 9,531,001 B2* | 12/2016 | Kozinsky | B60L 11/1861 |
| 2006/0068272 A1* | 3/2006 | Takami | B60L 3/0046 429/62 |
| 2009/0256528 A1* | 10/2009 | Greening | H01M 10/0525 320/162 |
| 2012/0148886 A1 | 6/2012 | Krause et al. | |
| 2012/0171524 A1 | 7/2012 | Hiraiwa et al. | |
| 2012/0276424 A1 | 11/2012 | Inoue et al. | |
| 2013/0004811 A1* | 1/2013 | Banerjee | G01K 7/16 429/62 |
| 2013/0122331 A1 | 5/2013 | McDonald | |

FOREIGN PATENT DOCUMENTS

| | | |
|---|---|---|
| CN | 102760913 A | 10/2012 |
| DE | 102005029124 A1 | 12/2006 |
| KR | 10-20080017379 A | 2/2008 |
| KR | 10-20130089376 A | 8/2013 |
| KR | 20130089376 A * | 8/2013 |

OTHER PUBLICATIONS

Supplementary European Search Report corresponding to European Patent Application No. 14 83 6740 (7 pages).

* cited by examiner

ELEVATED TEMPERATURE LI/METAL BATTERY SYSTEM

CROSS REFERENCE

This application claims the benefit of U.S. Provisional Application No. 61/866,219 filed Aug. 15, 2013, the entire contents of which is herein incorporated by reference.

FIELD OF THE DISCLOSURE

The present disclosure relates to batteries and more particularly to lithium-metal batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrodes. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures.

Dendrites are the most common failure mode for cells with Li metal anodes. The dendrites form with a needle-like structure and can grow through the separator during charging of the cell, resulting in an internal short. "Soft shorts" that burn out rapidly result in a temporary self-discharge of the cell, while "strong shorts" consisting of a higher, more stable contact area can lead to complete discharge of the cell, cell failure, and even thermal runaway. While dendrites typically grow through the separator during charge, shorts can also develop during discharge depending on the external pressure placed on the cell and/or internal volume changes that occur in both the negative and positive electrodes.

Because Li metal is highly electronically conductive, the surface of the Li tends to roughen as the metal is plated and stripped. Peaks in the surface grow as dendrites during charge. During discharge, some smoothing of the dendrites occurs. Nonetheless, there is typically some roughness that remains at the end of discharge. Depending on the depth of discharge, the overall roughness can be amplified from one cycle to the next. Because the metal is essentially at the same electrochemical potential throughout, potential and, to a lesser extent, concentration gradients in the electrolyte phase drive the change in morphology.

Related to dendrite initiation and growth is development of the Li morphology, which tends to increase the electrode surface area with cycling and consumes solvent to generate fresh passivation layers. Formation of high-surface-area mossy Li tends to occur during low-rate deposition from a liquid electrolyte, especially if the salt concentration is high. The high surface area combined with high reactivity of Li and flammability of the organic solvent makes for a very reactive and dangerous cell.

Another significant challenge in realizing a commercially viable battery incorporating a Li metal anode is the high Li metal interfacial resistance, and the slow transport of Li in the materials typically present in a solid state cell containing Li metal, as well as kinetics of Li transfer between phases on the cathode side of the cell. While these processes are typically assisted by operation at an elevated temperature, elevated temperatures require the use of an electrolyte in the cathode that is stable and has a low vapor pressure at high temperatures.

What is therefore needed is an electrochemical cell including a form of lithium in the anode which is capable of operation at elevated temperatures.

SUMMARY

In accordance with one embodiment an electrochemical cell system includes a housing, at least one electrochemical cell within the housing and including an anode including a form of lithium, and an ionic liquid electrolyte within a cathode, the cathode separated from the anode by a solid separator impervious to the ionic liquid electrolyte, a temperature sensor within the housing, and an environmental controller at least partially positioned within the housing and configured to maintain a temperature within the housing at least 50° C. above ambient based upon input from the temperature sensor.

In some embodiments the electrochemical cell system includes a memory, program instructions stored within the memory, and a processor operably connected to the memory, the environmental controller, and the temperature sensor. The processor is configured to execute the program instructions to obtain a signal from the temperature sensor, and control the environmental controller based upon the signal to maintain the temperature within the housing at least 50° C. above ambient.

In some embodiments the processor is configured to execute the program instructions to maintain the temperature within the housing between about 70° C. and 120° C. above ambient.

In some embodiments the environmental controller includes a heat exchanger at least partially positioned within the housing, and a temperature controlled liquid circulating within the heat exchanger.

In some embodiments the processor is configured to execute the program instructions to maintain the temperature of the temperature controlled liquid at a predetermined temperature set point stored within the memory.

In some embodiments the ionic liquid electrolyte includes imidazolium with a Li-TFSI salt.

In some embodiments the solid separator includes a solid ceramic Li conductor.

In some embodiments the solid separator includes a composite solid ceramic and polymer layer.

In accordance with one embodiment, a method of operating an electrochemical cell system, includes sensing a temperature within a housing with a temperature sensor, controlling an environmental controller at least partially positioned within the housing based upon the sensed temperature, and maintaining an ionic liquid electrolyte within a cathode separated from an anode by a solid separator impervious to the ionic liquid electrolyte at least 50° C. above ambient with the controlled environmental controller.

In some embodiments controlling the environmental controller includes executing program instructions stored within a memory with a processor to obtain a signal from the temperature sensor with a processor; and control the environmental controller based upon the signal to maintain the temperature within the housing at least 50° C. above ambient.

In some embodiments the processor is configured to execute the program instructions to maintain the temperature within the housing between about 70° C. and 120° C. above ambient.

In some embodiments controlling the environmental controller includes circulating a temperature controlled liquid within a heat exchanger at least partially positioned within the housing.

In some embodiments the processor is configured to execute the program instructions to maintain the temperature of the temperature controlled liquid at a predetermined temperature set point stored within the memory.

In some embodiments maintaining the ionic liquid electrolyte at least 50° C. above ambient includes maintaining an ionic liquid electrolyte including imidazolium with a Li-TFSI salt at least 50° C. above ambient.

In some embodiments the solid separator comprises a solid ceramic Li conductor.

In some embodiments the solid separator comprises a composite solid ceramic and polymer layer.

DESCRIPTION

Figure 1:
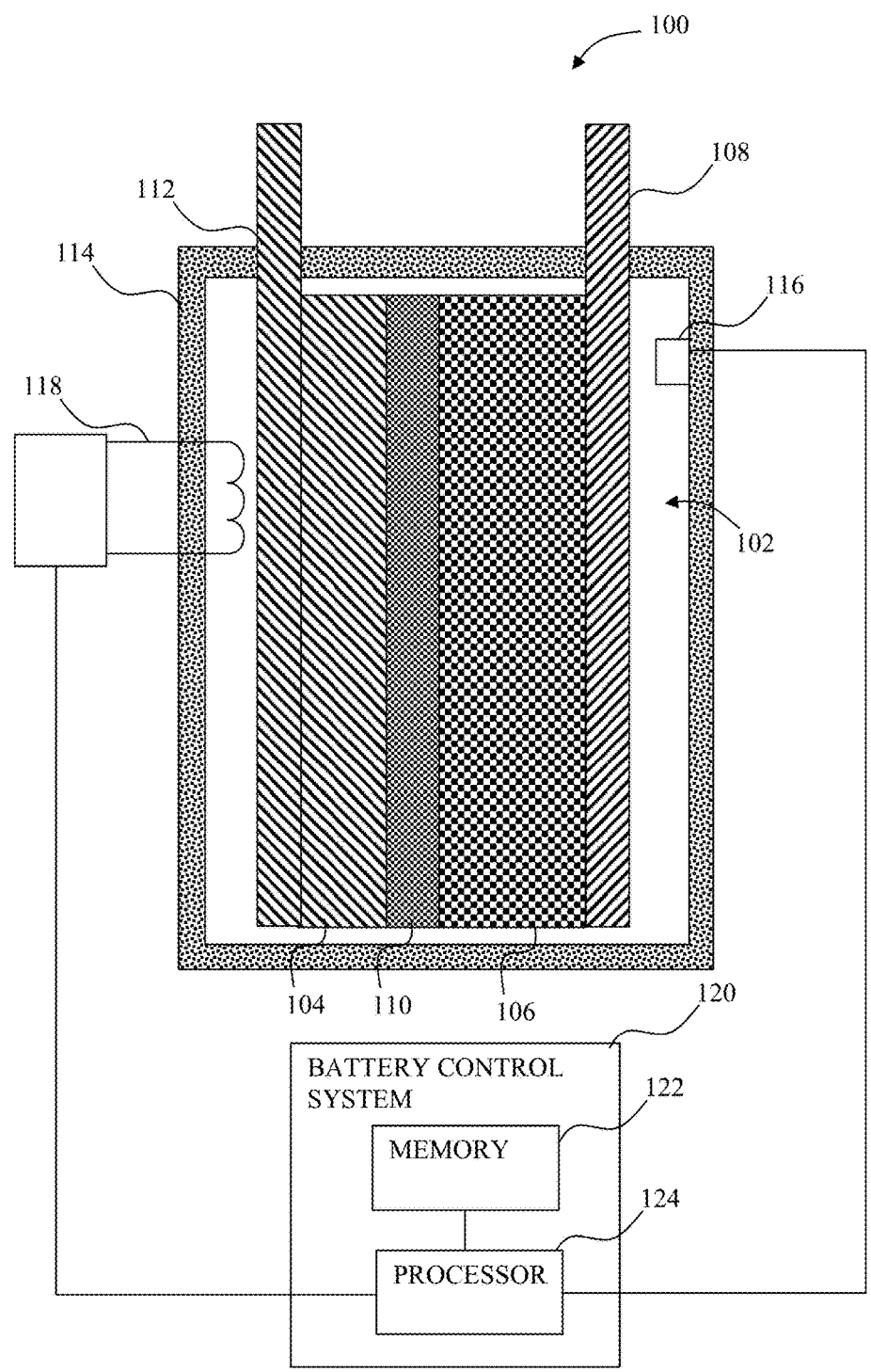
FIG. 1 depicts a simplified schematic of an electrochemical cell including an insulated housing and a thermal environment control system.

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 depicts an electrochemical cell system 100 which includes an electrochemical cell 102. The electrochemical cell 102 includes an anode 104, a cathode 106 with an aluminum current collector 108, and a separator structure 110. In some embodiments, a current collector 112 is included for the anode 104. The cell system 100 includes a housing 114 in which the electrochemical cell 102 is positioned. While only a single set of cell layers is shown in FIG. 1, the housing 114 in other embodiments encloses numerous sets of cell layers. A temperature sensor 116 is located within the housing 114 while at least a portion of an environmental controller 118 is within the housing 114.

The anode 104 includes lithium metal or a lithium alloy metal which, in embodiments including an anode current collector 112, is mounted on the current collector. The anode 104 is sized such that it has at least as much capacity as the cathode 106, and preferably at least 10% excess capacity and in some embodiments in excess of 50% excess capacity at beginning of life and full charge to account for Li metal that may be consumed in side reactions that take place during cycling. Li metal has a thickness of 4.85 μm per mAh/cm2. Accordingly, in one embodiment the lithium metal is initially provided between 1 and 20 mAh/cm2, and optionally above 20 mAh/cm2.

The cathode 106 contains an active material (such as a material that intercalates Li like $LiFePO_4$), an ionic liquid electrolyte (imidazolium with a Li-TFSI salt in one embodiment), and optionally a conductive additive that improves electronic conductivity (such as carbon black) and optionally a binder to improve the coherence of the particles in the cathode (such as PVDF). The capacity of the cathode 106 typically ranges from about 1 to 20 mAh/cm2, and optionally above 20 mAh/cm2. The cathode material that is chosen for a particular embodiment is stable for electrochemical operation at temperatures significantly above the ambient.

The ionic liquid electrolyte in the cathode 106 is selected so as to be stable at elevated temperature, such as up to 100° C., and in some embodiments up to 150° C., and in further embodiments up to 180° C. The ionic liquid is further selected to have a low vapor pressure and be safe at the elevated temperatures. Additionally, the ionic liquid preferably exhibits an ionic conductivity at elevated temperatures that allows the use of a thick cathode (the conductivity should be greater than 1 mS/cm and preferably greater than 10 mS/cm). The ionic liquid typically includes a salt that has a good solubility above 0.2 mol/L and preferably greater than 1 mol/L. The ionic liquid should also exhibit other properties typically required of a good electrolyte for a Li-ion battery.

The separator structure 110 is a layer that conducts Li ions but not electrons. The separator layer 110 may be composed of a solid ceramic Li conductor (such as a garnet material, or LISICON), a composite solid ceramic and polymer layer (such as a garnet material mixed with a polyethylene oxide), or a polymer layer (such as polyethylene oxide). In one embodiment, the separator layer is composed of a solid ceramic layer. The benefit of a solid ceramic layer is that no ionic liquid will be able to penetrate, unlike a polymer in which a small molecule like an ionic liquid may penetrate.

The cell 102 is operated during normal operations at a temperature that is significantly above ambient. In one embodiment, the temperature of the environment within the housing 114 is controlled to be at least 50° C. above ambient (i.e., temperature outside of the housing 114) but less than the melting temperature of the form of Li metal in the anode 104 which in the case of pure Li metal is 180° C.

Figure 2:
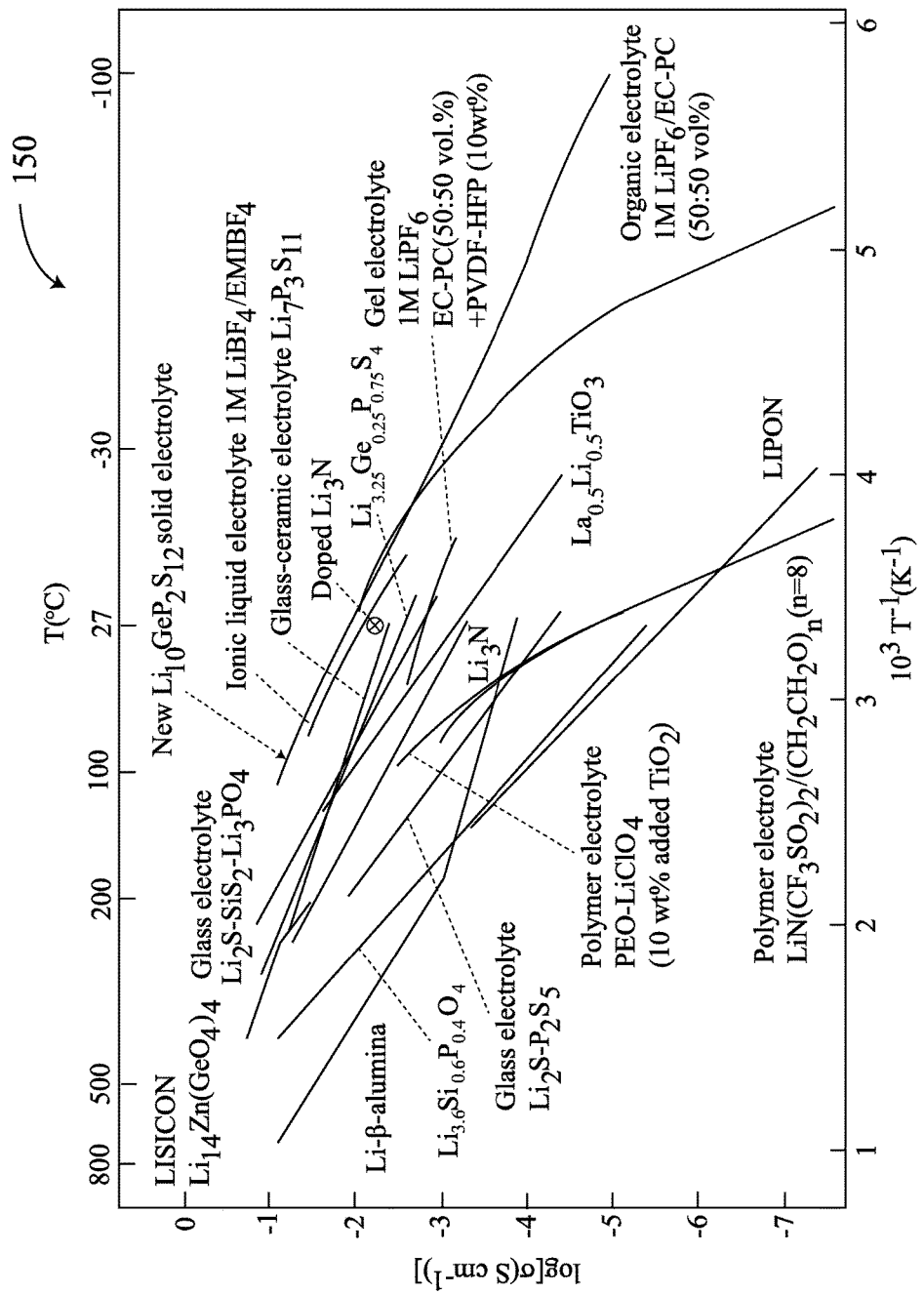
FIG. 2 depicts a plot showing the conductivity of numerous solid electrolyte materials as a function of temperature.

By operation at elevated temperature, the ionic conductivity of the ionic liquid is increased. FIG. 2 depicts a plot 150 of the ionic conductivity of many electrolytes, and how their conductivity depends on temperature as reported by Kamaya et al., "A lithium superionic conductor," Nature Materials, 2011. The current state of the art organic liquid electrolytes have a conductivity of around $1E^{-2}$ S/cm at 27° C. Ionic liquids have a lower conductivity, as do most solid electrolytes. Increasing the temperature to at least 50° C., and optionally up to 180° C., expands the possible set of materials that may be used because conductivity increases with increasing temperature. For example, the material $La_{0.5}Li_{0.5}TiO_3$ has a conductivity of slightly below 1E-3 S/cm at 27° C. but a conductivity slightly above 1E-2 S/cm at 100° C.

Because the cell 102 is operated at an elevated temperature, the transport of Li ions within the solid separator 110 is improved. Typically Li transport in solid materials is too slow at ambient temperatures for practical application in cells that have a high energy per mass and volume. Additionally, at elevated temperatures the kinetics of Li plating or stripping are improved. The transport of Li conduction and migration within the ionic liquid electrolyte of the cathode 106 is also significantly improved while other transport and kinetic processes have an improved rate. For example, the rates of the interfacial reactions in the cathode will be increased at elevated temperatures.

In order to achieve and maintain the desired elevated temperature, the environmental controller 118 in some embodiments is configured to cycle automatically based upon input from the temperature sensor 116. In some embodiments, a battery control system 120 which includes a memory 122 and a processor 124 is used to obtain data from the temperature sensor 116 and to control the environmental controller 118 based upon the obtained data to maintain a predetermined temperature. More specifically, the processor 124 executes program instructions stored within the memory 122 to control heating/cooling of the environment within the housing 114 with the environmental controller 118 based upon data provided to the processor 124 by the sensor 116. The predetermined temperature in some embodiments is stored within the memory.

The environmental controller 118 in some embodiments is a heater element. In other embodiments, the environmental controller 118 includes a temperature controlled liquid that is circulated within a heat exchanger in the housing 114. In further embodiments, the thermal insulating characteristics of the housing 114 are modified to assist in maintaining the desired temperature. Accordingly, thermal energy within the housing 114 is increased or decreased to provide the desired thermal environment for the electrochemical cell 102. Heat may need to be removed from the enclosure during operation because heat is generated within the battery during operation. However, during rest, when no heat is generated, heat may need to be supplied to the battery to maintain its elevated temperature.

The above described embodiments thus provide a battery composed of a Li metal anode, a solid protection layer that may be composed of a ceramic, a polymer, or a polymer/ceramic composite, and a cathode that includes an ionic liquid. The operating temperature for the described embodiments is significantly elevated above the ambient (i.e., in the range of 50° C. to the melting point of Li metal of 180° C., and more optimally in the range of 70 to 120° C.).

Accordingly, the described embodiments provide higher energy content through the use of Li metal along with higher power capability through the use of a high temperature that improves the transport and reaction kinetics. Materials that may have transport or kinetic properties that are unacceptable at ambient temperatures but have advantages such as good stability or low cost are enabled by operation at elevated temperatures.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. An electrochemical cell system, comprising:
a housing;
at least one electrochemical cell within the housing and including an anode including a form of lithium, and an ionic liquid electrolyte within a cathode, the cathode separated from the anode by a solid separator impervious to the ionic liquid electrolyte;
a temperature sensor within the housing;
an environmental controller at least partially positioned within the housing and configured to maintain a temperature within the housing above 70° C. based upon input from the temperature sensor;
a memory;
program instructions stored within the memory; and
a processor operably connected to the memory, the environmental controller, and the temperature sensor, the processor configured to execute the program instructions to
obtain a signal from the temperature sensor, and
control the environmental controller based upon the signal to maintain the temperature within the housing above 70° C. and below a melting temperature of the form of lithium, wherein the temperature is a temperature of the ionic liquid electrolyte within the cathode.

2. The system of claim 1, wherein the processor is configured to execute the program instructions to maintain the temperature within the housing above 70° C. and below about 120° C.

3. The system of claim 2, wherein the environmental controller comprises:
a heat exchanger at least partially positioned within the housing; and
a temperature controlled liquid circulating within the heat exchanger.

4. The system of claim 3, wherein the processor is configured to execute the program instructions to maintain the temperature of the temperature controlled liquid at a predetermined temperature set point stored within the memory.

5. The system of claim 2, wherein the ionic liquid electrolyte comprises imidazolium with a lithium bis(trifluoromethanesulfonyl)imide (Li-TFSI) salt.

6. The system of claim 2, wherein the solid separator comprises a solid ceramic Li conductor.

7. The system of claim 2, wherein the solid separator comprises a composite solid ceramic and polymer layer.

8. A method of operating an electrochemical cell system with at least one electrochemical cell within a housing, the at least one electrochemical cell including an anode including a form of lithium, and an ionic liquid electrolyte within a cathode, the cathode separated from the anode by a solid separator impervious to the ionic liquid electrolyte, the method comprising:

sensing a temperature within the housing with the temperature sensor;

controlling an environmental controller at least partially positioned within the housing based upon the sensed temperature; and maintaining the temperature within the housing above 70° C. and below a melting temperature of the form of lithium with the controlled environmental controller, wherein the temperature within the housing is a temperature of the ionic liquid electrolyte, and wherein controlling the environmental controller comprises executing program instructions stored within a memory with a processor to:

obtain a signal from the temperature sensor with a processor; and control the environmental controller based upon the signal.

9. The method of claim 8, wherein the processor is configured to execute the program instructions to maintain the temperature within the housing above 70° C. and below about 120° C.

10. The method of claim 9, wherein controlling the environmental controller comprises:

circulating a temperature controlled liquid within a heat exchanger at least partially positioned within the housing.

11. The method of claim 10, wherein the processor is configured to execute the program instructions to maintain the temperature of the temperature controlled liquid at a predetermined temperature set point stored within the memory.

12. The method of claim 8, wherein maintaining the temperature within the housing above 70° C. and below a melting temperature of the form of lithium comprises:

maintaining an ionic liquid electrolyte including imidazolium with a lithium bis(trifluoromethanesulfonyl) imide (Li-TF SI) salt above 70° C. and below a meltdown temperature of the form lithium.

13. The method of claim 8, wherein the solid separator comprises a solid ceramic Li conductor.

14. The method of claim 8, wherein the solid separator comprises a composite solid ceramic and polymer layer.

* * * * *

UNITED STATES PATENT AND TRADEMARK OFFICE
CERTIFICATE OF CORRECTION

PATENT NO. : 10,218,028 B2
APPLICATION NO. : 14/459781
DATED : February 26, 2019
INVENTOR(S) : Albertus et al.

It is certified that error appears in the above-identified patent and that said Letters Patent is hereby corrected as shown below:

In the Claims

In Column 18, Lines 18-21, Lines 4-7 of Claim 12 should read:
maintaining an ionic liquid electrolyte including imida-
    zolium with a lithium bis(trifluoromethanesulfonyl)
    imide (Li-TFSI) salt above 70° C. and below a
    melting temperature of the form of lithium.

Signed and Sealed this
Twenty-fifth Day of June, 2019

Andrei Iancu
*Director of the United States Patent and Trademark Office*